(12) United States Patent
Yokochi et al.

(10) Patent No.: US 8,077,204 B2
(45) Date of Patent: Dec. 13, 2011

(54) VEHICLE PERIPHERY MONITORING DEVICE, VEHICLE, VEHICLE PERIPHERY MONITORING PROGRAM, AND VEHICLE PERIPHERY MONITORING METHOD

(75) Inventors: Yuji Yokochi, Wako (JP); Nobuharu Nagaoka, Wako (JP); Fuminori Taniguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 25 days.

(21) Appl. No.: 12/812,080

(22) PCT Filed: Nov. 18, 2008

(86) PCT No.: PCT/JP2008/003371
§ 371 (c)(1),
(2), (4) Date: Jul. 8, 2010

(87) PCT Pub. No.: WO2009/098743
PCT Pub. Date: Aug. 13, 2009

(65) Prior Publication Data
US 2010/0283845 A1 Nov. 11, 2010

(30) Foreign Application Priority Data
Feb. 4, 2008 (JP) ................................. 2008-024402

(51) Int. Cl.
*H04N 7/18* (2006.01)
(52) U.S. Cl. ...................................................... 348/148
(58) Field of Classification Search ........... 348/148–149
See application file for complete search history.

(56) References Cited

U.S. PATENT DOCUMENTS
5,670,935 A * 9/1997 Schofield et al. ............. 340/461
(Continued)

FOREIGN PATENT DOCUMENTS
JP 08-313632 A 11/1996
(Continued)

OTHER PUBLICATIONS
Andreas, Wedel et al., "Realtime Depth Estimation and Obstacle Detection From Monocular Video", Jan. 1, 2006, Pattern Recognition: 28th DAGM Symposium, Berlin, Germany, Sep. 12-14, 2006; Proceedings; [Lecture Notes in Computer Science], Springer, Berlinm, DE, pp. 475-484, XP019043086, ISBN: 978-3-540-44412-1 *Section 1, 2, Equation 5*.

(Continued)

*Primary Examiner* — David Czekaj
(74) *Attorney, Agent, or Firm* — Carrier Blackman & Associates, P.C.; Joseph P. Carrier; William D. Blackman

(57) ABSTRACT

A vehicle periphery monitoring device comprising a distance detecting unit which detects the distance between cameras and an object, an object image extracting unit which extracts a first image portion of the object from the acquired image, a filtering unit which performs a filtering process to the acquired image, in which a target edge width is set to be narrower as the assumed value of the width is smaller and the distance is longer, and in which a target edge direction is set to a direction orthogonal to the predetermined direction, and an object type identifying unit which identifies, on the basis of a shape of a second image portion extracted by the filtering process, whether or not the type of the object in real space corresponding to the second image portion is the specific type.

2 Claims, 8 Drawing Sheets

U.S. PATENT DOCUMENTS

| | | |
|---|---|---|
| 6,327,536 B1 | 12/2001 | Tsuji et al. |
| 6,590,521 B1 | 7/2003 | Saka et al. |
| 6,847,894 B1 * | 1/2005 | Hasegawa .................... 701/301 |
| 2005/0063565 A1 | 3/2005 | Nagaoka et al. |
| 2005/0276447 A1 | 12/2005 | Taniguchi et al. |
| 2007/0171033 A1 | 7/2007 | Nagaoka et al. |

FOREIGN PATENT DOCUMENTS

| | | |
|---|---|---|
| JP | 09-027100 A | 1/1997 |
| JP | 2001-006096 A | 1/2001 |
| JP | 2001-134769 A | 5/2001 |
| JP | 2005-128815 A | 5/2005 |
| JP | 2006-101384 A | 4/2006 |
| JP | 2007-037011 A | 2/2007 |

OTHER PUBLICATIONS

Liyuan, Li et al.: "Stereo-Based Human Detection for Mobile Service Robots" Control, Automation, Robotics and Vision Conference, 2004. ICARCV 2004 8th Kunming, China Dec. 6-9, 2004, Piscataway, NJ, USA, IEEE, US, vol. 1, Dec. 6, 2004 pp. 74-79, XP010817961, DOI: DOI: 10.1109/ICARCV.2004.1468801 ISBN: 978-0-7803-8653-2 *Section 2*.

* cited by examiner

FIG.7
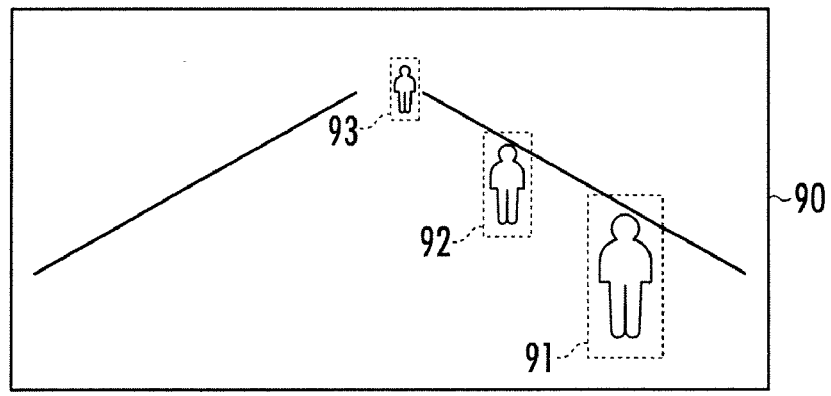
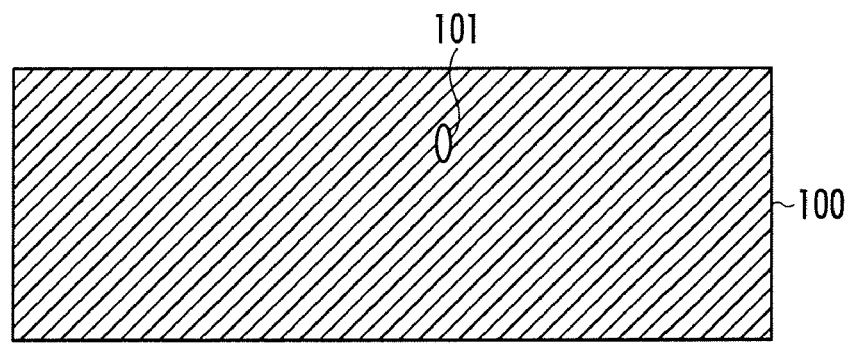
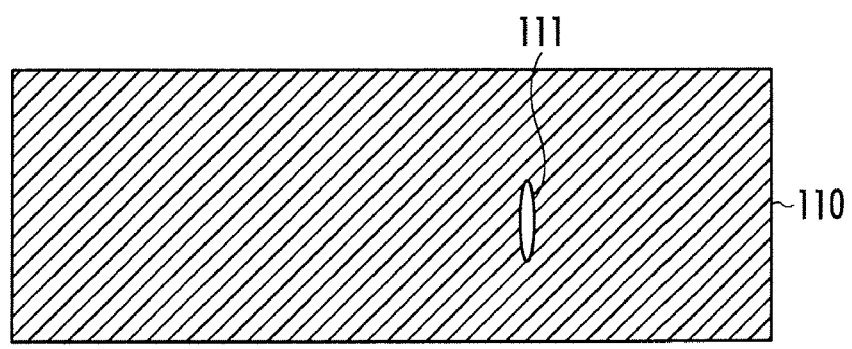
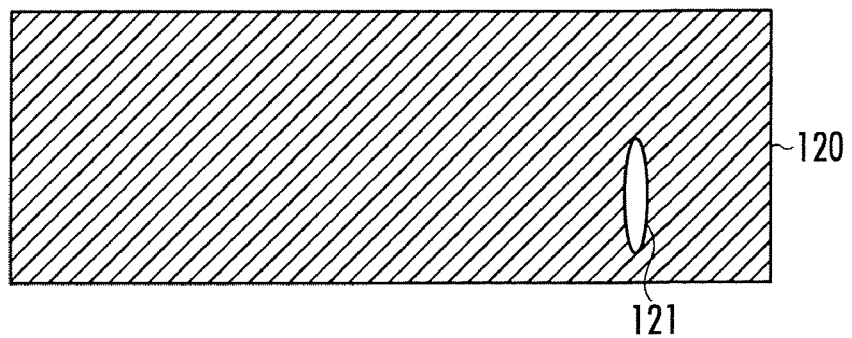

VEHICLE PERIPHERY MONITORING DEVICE, VEHICLE, VEHICLE PERIPHERY MONITORING PROGRAM, AND VEHICLE PERIPHERY MONITORING METHOD

CROSS-REFERENCE TO RELATED APPLICATIONS

The present invention claims priority under 35 USC 119 based on Japanese patent application No. 2008-024402 filed on 4 Feb. 2008 and PCT application No. PCT/JP2008/003371 filed 18 Nov. 2008. The entire subject matter of this priority document, including the specification, claims and drawings thereof, is incorporated by reference herein.

BACKGROUND OF THE INVENTION

1. Technical Field

The present invention relates to a vehicle periphery monitoring device, vehicle, vehicle periphery monitoring program, and vehicle periphery monitoring method which monitors a periphery of a vehicle by detecting an object present in the periphery of the vehicle, from an acquired image of the periphery of the vehicle by a camera mounted on the vehicle.

2. Description of the Related Art

There is known a vehicle periphery monitoring device which detects an object in a periphery of a vehicle from an acquired image of the periphery of the vehicle by a camera mounted on the vehicle, calculates a relative position and relative velocity of the object in real space and the vehicle, and determines a possibility of contact between the vehicle and the object within a predetermined time (for example, refer to Japanese Patent Laid-Open No. 2001-6096).

Further, in order to identify a type of the object (human being, vehicle, large animal, and the like), a process of extracting a shape (area, outline, horizontal to vertical ratio, and the like) of an image portion in a binarized image which is obtained by binarizing a multiple-valued image obtained by the camera is carried out (for example, Japanese Patent Laid-Open No. H8-313632).

In the device disclosed in Japanese Patent Laid-Open No. H8-313632, a ratio between a width between a minimum value and a maximum value of an edge coordinate in the horizontal direction and a width between a minimum value and a maximum value of the edge coordinate in the vertical direction of a window circling the image portion in the binarized image is calculated as a horizontal to vertical ratio R, and whether or not the object in real space corresponding to the image portion is a human being is determined on the basis of the horizontal to vertical ratio R.

However, in the case of determining whether or not the object is a human being on the basis of the width between edges, there is an inconvenience that the width of the image portion of the object is not properly calculated, when image portions of a plurality of objects are included in the window. As such, there is an inconvenience that the identification accuracy of the type of the object is reduced.

SUMMARY OF THE INVENTION

In view of the above circumstances, an object to be solved by the present invention is to provide a vehicle periphery monitoring device, a vehicle, a vehicle periphery monitoring program, and a vehicle periphery monitoring method capable of identifying a type of an object with high accuracy, on the basis of a shape of an outline of an image portion of the object extracted from an acquired image by a camera.

In order to achieve the object mentioned above, a vehicle periphery monitoring device of the present invention is a vehicle periphery monitoring device which monitors a periphery of a vehicle on the basis of acquired images by a camera mounted on the vehicle and acquiring images of the periphery of the vehicle.

The vehicle periphery monitoring device comprises a distance detecting unit for detecting a distance between the camera and an object; an object image extracting unit which extracts a first image portion of the object from the acquired image by the camera; a filtering unit which performs, on the basis of an assumed value of a width in a predetermined direction of the object of a specific type, and the distance between the camera and the object in real space corresponding to the first image portion detected by the distance detecting unit, a filtering process to the acquired image with a Gabor filter, in which a target edge width is set to be narrower as the assumed value of the width is smaller and the distance is longer, and in which a target edge direction is set to a direction orthogonal to the predetermined direction; and an object type identifying unit which identifies, on the basis of a shape of a second image portion extracted by the filtering process, whether or not the type of the object in real space corresponding to the second image portion is the specific type.

Further, a vehicle of the present invention is a vehicle equipped with a camera for acquiring images of its periphery, and has a function of monitoring the periphery on the basis of the acquired image by the camera.

The vehicle of the present invention comprises a distance detecting unit which detects a distance between the camera and an object; an object image extracting unit which extracts a first image portion of the object from the acquired image by the camera; a filtering unit which performs, on the basis of an assumed value of a width in a predetermined direction of the object of a specific type, and the distance between the camera and the object in real space corresponding to the first image portion detected by the distance detecting unit, a filtering process to the acquired image with a Gabor filter, in which a target edge width is set to be narrower as the assumed value of the width is smaller and the distance is longer, and in which a target edge direction is set to a direction orthogonal to the predetermined direction; and an object type identifying unit which identifies, on the basis of a shape of a second image portion extracted by the filtering process, whether or not the type of the object in real space corresponding to the second image portion is the specific type.

In the vehicle periphery monitoring device and vehicle of the present invention, the size of the image portion of the object in the acquired image by the camera becomes smaller as the object becomes smaller, and also becomes smaller as the distance between the camera and the object becomes longer. Therefore, by performing the filtering process by the filtering unit on the basis of the distance between the camera and the object in real space corresponding to the first image portion detected by the distance detecting unit, and the assumed value of the width in the predetermined direction of the object, using the Gabor filter, in which the target edge width is set to be narrower as the assumed value of the width is smaller and the distance is longer, and the target edge direction is set to a direction orthogonal to the predetermined direction, it becomes possible to extract the second image portion, while emphasizing only the edge region in a direction orthogonal to the predetermined direction of the target edge width that is assumed to be the image portion of the object of the specific type. Thereafter, it becomes possible to identify the type of the object in real space corresponding to the second image portion with high accuracy, on the basis of the shape of the second image portion extracted as explained above.

Further, the present invention is characterized by comprising a local processing region setting unit which sets, on the basis of an assumed value of a size of the object of the specific type, and the distance between the object in real space corresponding to the first image portion and the camera detected by the distance detecting unit, a surrounding region of the first image portion including the first image portion as a local processing region, wherein the filtering unit performs the filtering process only to the local processing region, and the object type identifying unit identifies, on the basis of the shape of the second image portion extracted by the filtering process to the local processing region, whether or not the type of the object in real space corresponding to the second image portion is the specific type.

According to the present invention, it becomes possible to extract the second image portion effectively, by reducing the calculation amount during the filtering process, which is made possible by carrying out the filtering process only to the local processing region surrounding the first image portion set by the local processing region setting unit.

Further, in the present invention, the specific type is a pedestrian, the specific direction is a horizontal direction, the direction orthogonal to the specific direction is the direction orthogonal to the specific direction, and the object type identifying unit identifies the type of the object in real space corresponding to the second image portion as a pedestrian, when a lower end of the second image portion extracted by the filtering process is included in a lower half region of the local processing region in the local processing region.

According to the present invention, in the case where the second image portion having the edge width in the horizontal direction corresponding to the distance of the assumed value of the width in the horizontal direction of the pedestrian, and having the edge direction in the vertical direction, is extracted by the filtering process from the acquired image by the camera, it is evaluated that the second image portion includes an image portion of a leg of a pedestrian, when the lower end of the second image portion is included in the lower half region of the local processing region. Therefore, it becomes possible to identify that the type of the object in real space corresponding to the second image portion is a pedestrian.

Next, a vehicle periphery monitoring program of the present invention is a program enabling a computer mounted on a vehicle and which has a unit which accesses data of acquired images by a camera acquiring images of a periphery of the vehicle, to perform the function of monitoring the periphery of the vehicle on the basis of the acquired images.

Further, the program makes the computer function as a distance detecting unit which detects a distance between the camera and an object; an object image extracting unit which extracts a first image portion of the object from the acquired image by the camera; a filtering unit which performs, on the basis of an assumed value of a width in a predetermined direction of the object of a specific type, and the distance between the camera and the object in real space corresponding to the first image portion detected by the distance detecting unit, a filtering process to the acquired image with a Gabor filter, in which a target edge width is set to be narrower as the assumed value of the width is smaller and the distance is longer, and in which a target edge direction is set to a direction orthogonal to the predetermined direction; and an object type identifying unit which identifies, on the basis of a shape of a second image portion extracted by the filtering process, whether or not the type of the object in real space corresponding to the second image portion is the specific type.

Execution of the vehicle periphery monitoring program of the present invention is possible using the distance detecting unit, the object image extracting unit, the filtering unit, and the object type identifying unit of the present invention, and the vehicle periphery monitoring device is able to be constituted on the vehicle of the present invention.

Further, a vehicle periphery monitoring method of the present invention is a method of monitoring a periphery of a vehicle with a computer mounted on the vehicle and which includes a unit which accesses data of acquired images by a camera acquiring images of the periphery of the vehicle, on the basis of the acquired image.

The method comprises a distance detecting step in which the computer detects a distance between the camera and an object; an object image extracting step in which the computer extracts a first image portion of the object from the acquired image by the camera; a filtering step in which the computer performs, on the basis of an assumed value of a width in a predetermined direction of the object of a specific type, and the distance between the camera and the object in real space corresponding to the first image portion detected in the distance detecting step, a filtering process to the acquired image with a Gabor filter, in which a target edge width is set to be narrower as the assumed value of the width is smaller and the distance is longer, and in which a target edge direction is set to a direction orthogonal to the predetermined direction; and an object type identifying step in which the computer identifies, on the basis of a shape of a second image portion extracted by the filtering process, whether or not the type of the object in real space corresponding to the second image portion is the specific type.

In the present invention, the size of the image portion of the object in the acquired image of the camera becomes smaller as the object becomes smaller, and also becomes smaller as the distance between the camera and the object becomes longer. Therefore, by performing the filtering process in the filtering step on the basis of the distance between the camera and the object in real space corresponding to the first image portion detected in the distance detecting step, and the assumed value of the width in the predetermined direction of the object, using the Gabor filter, in which the target edge width is set to be narrower as the assumed value of the width is smaller and the distance is longer, and the target edge direction is set to be a direction orthogonal to the predetermined direction, it becomes possible to extract the second image portion, while emphasizing only the edge region in a direction orthogonal to the predetermined direction of the target edge width that is assumed to be the image portion of the object of the specific type. Thereafter, it becomes possible to identify the type of the object in real space corresponding to the second image portion with high accuracy, on the basis of the shape of the second image portion extracted as explained above, in the object type identifying step.

BRIEF DESCRIPTION OF THE DRAWINGS

FIG. 7 is a view explaining setting of an target edge width of the Gabor filter according to the distance to the object.

DETAILED DESCRIPTION OF THE PRESENT EXEMPLARY EMBODIMENTS

Figure 1:
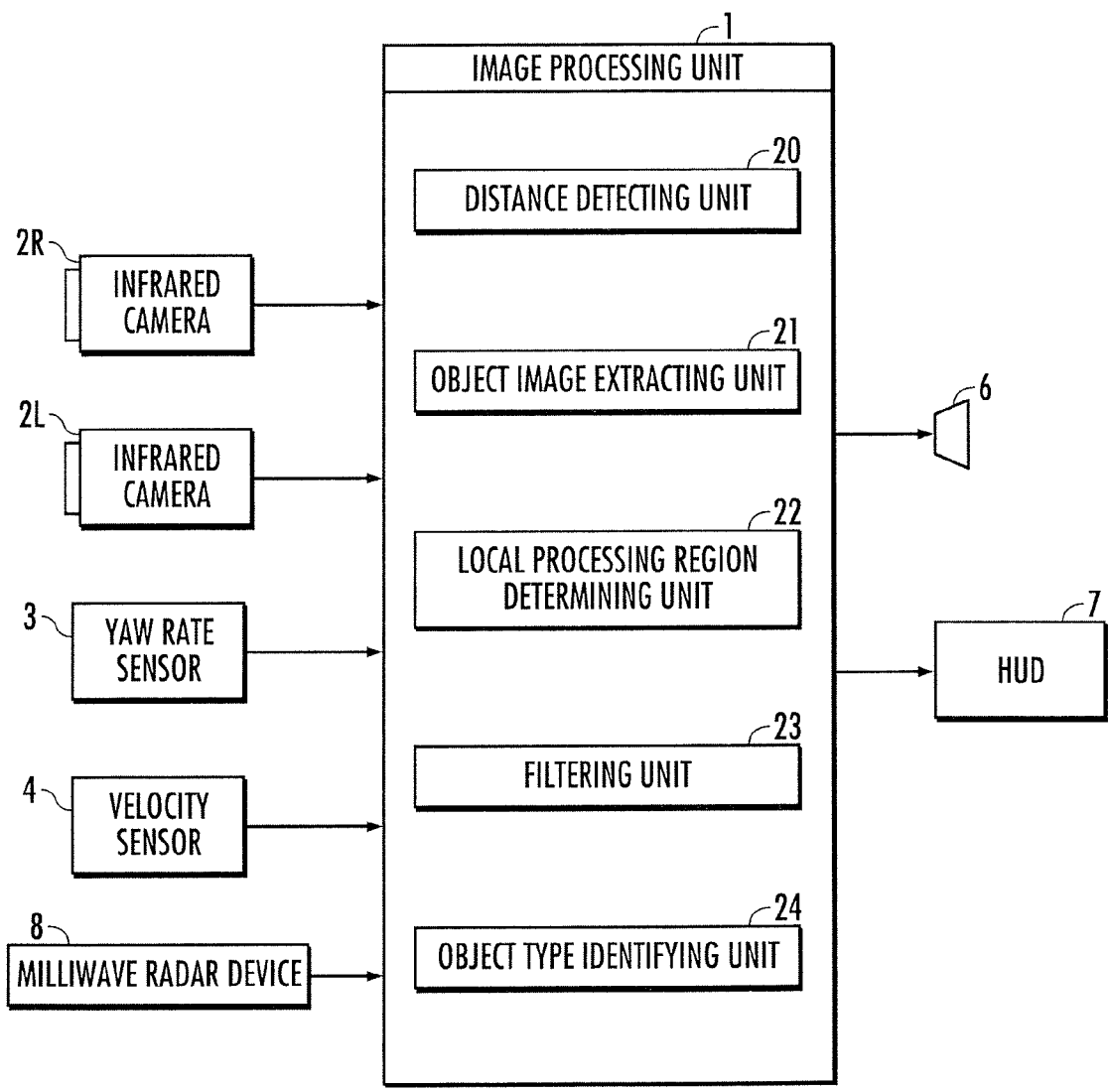
FIG. 1 is a configuration view of a vehicle periphery monitoring device of the present invention.

An exemplary embodiment of the present invention will now be explained below with reference to FIG. 1 through FIG. 8. FIG. 1 is a configuration diagram of a vehicle periphery monitoring device of the present invention. The vehicle periphery monitoring device of the present invention is equipped with an image processing unit 1, infrared cameras (corresponds to the camera of the present invention) 2R, 2L capable of detecting far-infrared rays, a yaw rate sensor 3 for detecting yaw rate of the vehicle, a velocity sensor 4 for detecting the traveling speed of the vehicle, a loudspeaker 6 for performing warning by sound, a head-up display (hereinafter referred to as HUD) 7 for performing display to make the driver observe an object, and a milliwave radar device 8 for detecting distance between the cameras 2R, 2L and the object.

Figure 2:
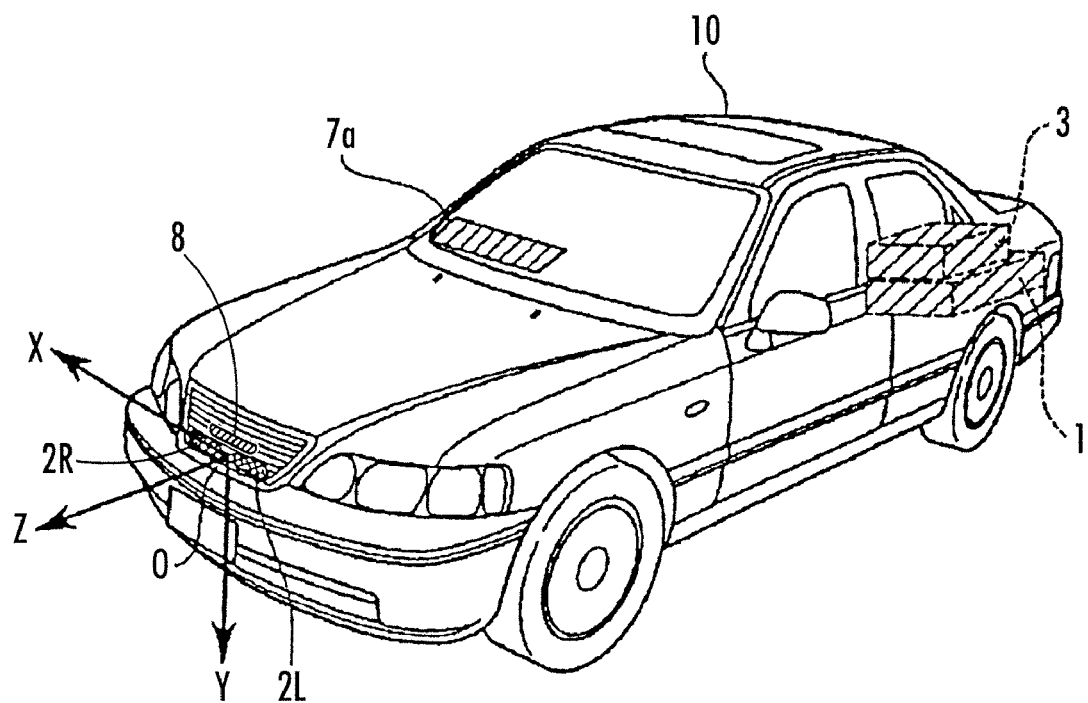
FIG. 2 is a view explaining a mounting mode of the vehicle periphery monitoring device shown in FIG. 1 on a vehicle.

With reference to FIG. 2, the infrared cameras 2R, 2L are arranged at the front of a vehicle 10, at the positions approximately symmetrical with respect to the center in the width direction of the vehicle 10. Further, the infrared cameras 2R, 2L are fixed with their optical axes parallel to each other and so as to have equal height from the road surface. The infrared cameras 2R, 2L have characteristics that the output level becomes higher (luminance becomes higher) as the temperature of the imaged object becomes higher. Further, a HUD 7 is provided so as to display a display 7a on a windshield of the vehicle 10 at the front position on the driver side.

Further, the milliwave radar device 8 is fixed to the upper side of the infrared cameras 2R, 2L at the front of the vehicle 10. The milliwave radar device 8 transmits milliwave beam to the front of the vehicle 10, and receives a reflected wave of the milliwave (milliwave reflected by an object existing at the front of the vehicle 10). The scanning range of the beam of the milliwave radar device 8 is set so as to include the imaging range (range of the view angle) of the infrared cameras 2R, 2L.

The milliwave radar device 8 detects the object existing in the transmitting direction of the beam, on the basis of the reflected wave with a predetermined intensity or more, among all received reflected wave. Further, the milliwave radar device 8 detects the distance between the object reflecting the milliwave and the cameras 2R, 2L, on the basis of the temporal difference between the transmitted wave and the received wave.

With reference to FIG. 1, the image processing unit 1 is an electronic unit configured from a microcomputer (not shown, corresponds to a computer of the present invention) and the like, and includes a function of converting the analog video signals output from the infrared cameras 2R, 2L to digital data and importing the same to an image memory (not shown), and carrying out various arithmetic processing to the image of the front of the vehicle imported into the image memory with the microcomputer, via an interface circuit (not shown, corresponds to a unit which accesses the acquired image of the present invention).

By making the microcomputer execute a vehicle monitoring program of the present invention, the microcomputer functions as a distance detecting unit 20 which detects the distance (real space distance) between the object in the real space corresponding to the image portion included in the acquired image by the cameras 2R, 2L and the cameras 2R, 2L, an object image extracting unit 21 which extracts the image portion of the object from the acquired image by the camera 2R, a local processing region setting unit 22 which sets a surrounding region including the image portion of the object as a local processing region, a filtering unit 23 which executes a filtering process to the local processing region with a Gabor filter, and an object type identifying unit 24 which identifies the type of the object in real space corresponding to the image portion extracted by the filtering process.

Still further, each step of a vehicle periphery monitoring method of the present invention is executed by the microcomputer.

The image processing unit 1 is input with the analog signals of the infrared images of the periphery of the vehicle output from the infrared cameras 2R, 2L, and stores multivalued (grayscale) images obtained by digitalizing the analog signals by A/D (analog/digital) conversion to an image memory (not shown).

Thereafter, the image processing unit 1 carries out the process of identifying the type of the object in real space corresponding to the image portion included in the right image. Hereinafter, the process will be explained according to the flow chart shown in FIG. 3.

Figure 3:
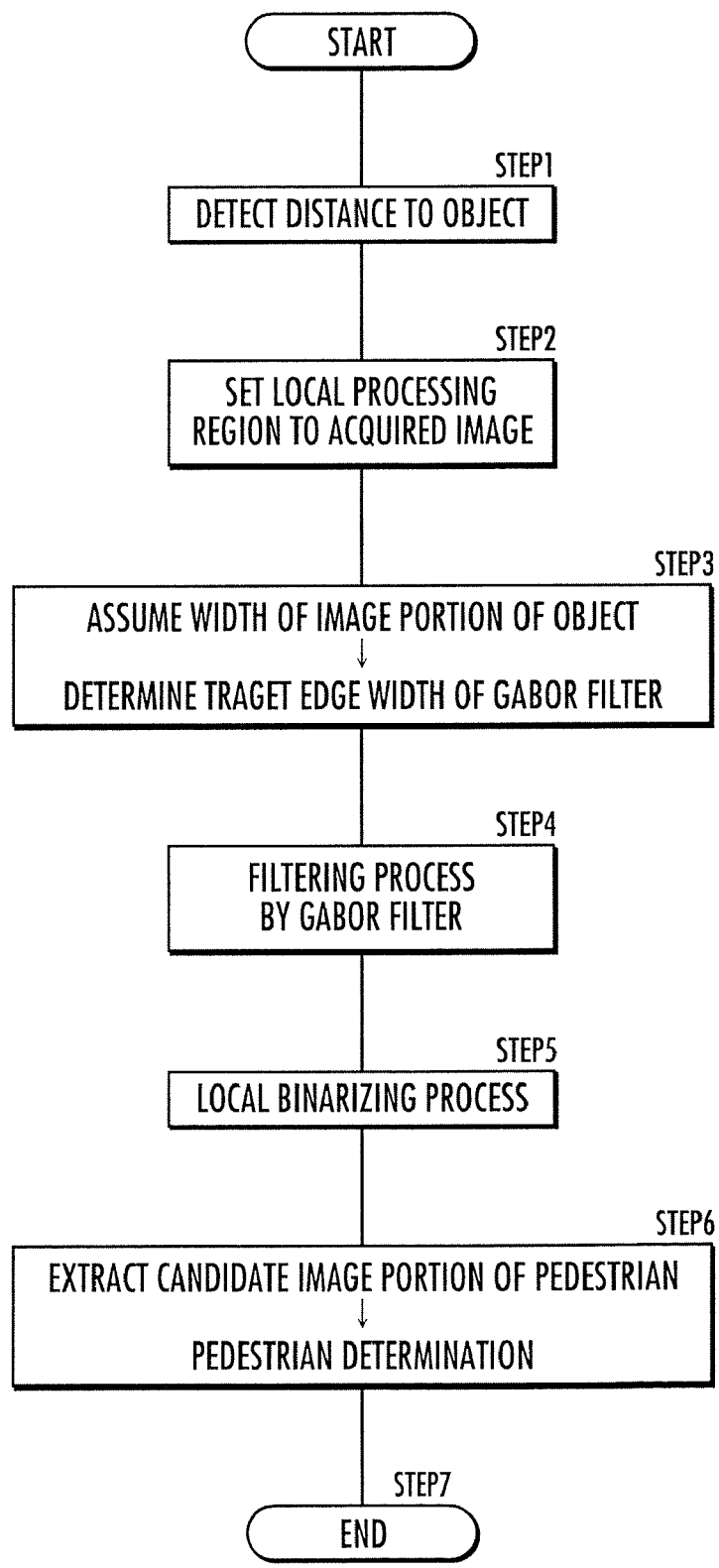
FIG. 3 is a flowchart of an identification process of an object type by an image processing unit shown in FIG. 1.

STEP 1 in FIG. 3 is a process by the distance detecting unit 20. The distance detecting unit 20 detects the distance Z between the object in the periphery of the vehicle and the cameras 2R, 2L, on the basis of a ranging data of a scanned portion output from the milliwave radar device 8. The process of detecting the distance Z between the object and the cameras 2R, 2L by the distance detecting unit 20 corresponds to a distance detecting step of the vehicle periphery monitoring method of the present invention.

Subsequent STEP 2 is a process by the object image extracting unit 21 and the local processing region setting unit 22. The object image extracting unit 21 generates a binary image by performing a binarizing process (process of setting pixels having a luminance of a predetermined binarizing threshold value or more to "1 (white)", and pixels having a luminance smaller than the predetermined binarizing threshold to "0 (black)"), taking the right image as reference image. Thereafter, the object image extracting unit 21 extracts the high-luminance (white region) image portion included in the binary image, in which the distance of the object in real space corresponding thereto is detected by the distance detecting unit 20 in STEP 1, as a first image portion of the object.

The process of extracting the first image portion of the object by the object image extracting unit 21 corresponds to an object extracting step of the vehicle periphery monitoring method of the present invention.

Figure 4:
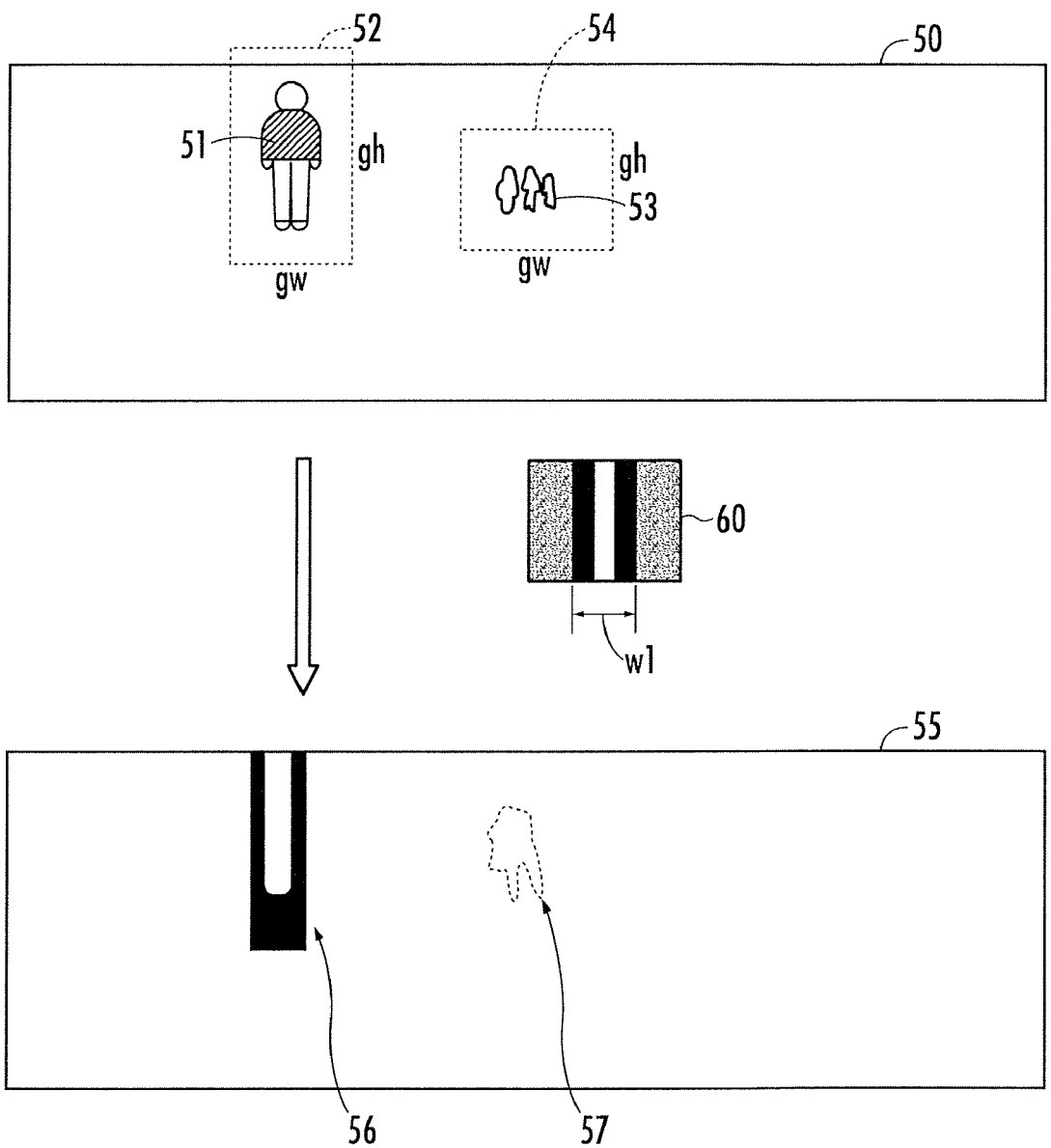
FIG. 4 is a view explaining a filtering process by a Gabor filter.

Thereafter, with reference to FIG. 4, the local processing region setting unit 22 sets a local processing region 52 taking a pedestrian as the identification target, to the first image portion 51 of the object extracted from the image 50. Further, a local processing region 54 taking the pedestrian as the identification target is set to the other first image portion 53 of the object.

To be more specific, the local processing region setting unit 22 calculates a height gh and a width gw of the local processing regions 52, 54, on the basis of an assumed value GH of a body height of a pedestrian (170 cm for example, corresponds to an assumed value of a size of the object in real space of the present invention), an assumed value GW of a width of a pedestrian (60 cm for example, corresponds to the assumed value of the size of the object in real space of the present invention), and the distance Z between the object and the infrared cameras 2R, 2L, according to an equation (1) and an equation (2) below.

$$gh = \frac{f}{p} \cdot \frac{GH}{Z} \quad (1)$$

$$gw = \frac{f}{p} \cdot \frac{GW}{Z} \quad (2)$$

where f: the focal length of the infrared cameras 2R, 2L, p: the pixel spacing of imaging elements of the infrared cameras 2R, 2L, GH: the assumed value of the body height of the pedestrian, GW: the assumed value of the width of the pedestrian, and Z: the distance between the infrared cameras 2R, 2L and the object.

By determining the height gh and the width gw of the local processing regions 52, 54 as described above, it becomes possible to set the local processing regions 52, 54, when the first image portions 51, 53 are image portions of the pedestrian, in a neighborhood range including the image portion of the overall pedestrian. In the local processing region 54, the width gw is increased because the pedestrians are next to each other.

Subsequent STEP 3 to STEP 4 are processes by the filtering unit 23. The filtering unit 23 first sets the Gabor filter having a target edge width and a target edge direction corresponding to the distance Z between the object and the cameras 2R, 2L, taking the pedestrian as the identification target.

The Gabor filter is a filter similar to the characteristics of the human's receptive field, which extracts an edge (outline) in a specific direction and with a specific width. For example, as is shown in FIG. 4, in the case where the first image portion 51 of the pedestrian with the distance Z to the infrared cameras 2R, 2L being close and the other first image portion 53 of the pedestrian being far are included in the image 50, the Gabor filter 60 taking the assumed value w1 of the width of the image portion of the pedestrian existing at close distance as the target edge width, and the vertical direction (body height direction of the pedestrian) as the target edge direction is set.

By executing the filtering process with the Gabor filter 60 to the image 50, an image portion 56 with the vertical edge of the first image portion 51 of the pedestrian at close distance being emphasized is generated in an image 55 after the filtering process. Further, an image portion 57 with a blurred vertical edge is generated for the other first image portion 53 of the pedestrian at far distance.

Figure 5:
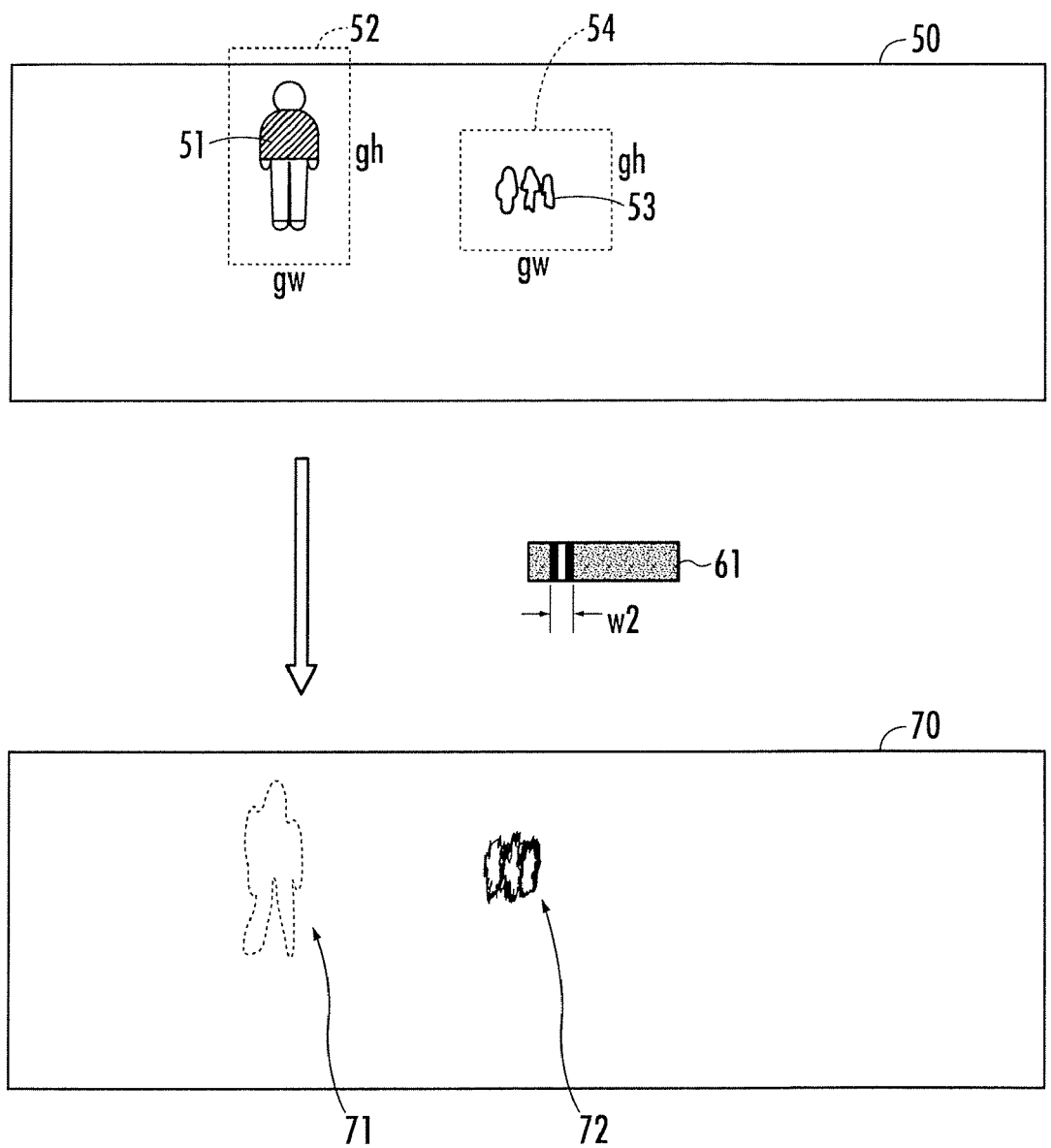
FIG. 5 is a view explaining the filtering process by the Gabor filter.

FIG. 5 shows the case where the filtering process with the Gabor filter 61 taking the assumed value W2 of the width of the image portion of the pedestrian existing at far distance as the target edge width and taking the vertical direction as the target direction, is performed to the image 50. In this case, an image portion 72 with the vertical edge of the other first image portion 53 of the pedestrian at far distance being emphasized is generated in an image 70 after the filtering process. Further, an image portion 71 with a blurred vertical edge is generated for the first image portion 51 of the pedestrian at close distance.

By executing the filtering process with the Gabor filter setting the target edge width according to the distance Z between the infrared cameras 2R, 2L and the object, it becomes possible to emphasize the vertical direction edge only for the image portion of the pedestrian which is a specific distance away.

As such, the filtering unit 23 determines the target edge width Wt from an assumed value Wp of the width of the pedestrian, shown in FIG. 6(*a*) (50 cm for example, data of Wp is preliminary stored in a memory), and the distance Z between the object in real space corresponding to the image portion and the cameras 2R, 2L, according to an equation (3) below.

$$Wt = \frac{f}{p} \cdot \frac{Wp}{Z} \quad (3)$$

where Wt: the target edge width of the Gabor filter, f: the focal length of the infrared cameras 2R, 2L, p: the pixel spacing of the imaging elements of the infrared cameras 2R, 2L, Wp: the assumed value of the width of the pedestrian, Z: the distance between the object and the infrared cameras 2R, 2L.

Figure 6:
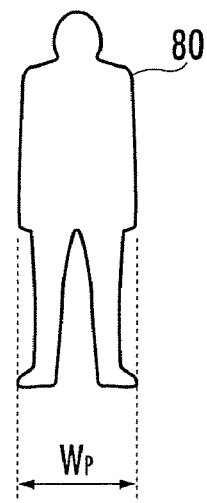
FIG. 6(a) is a view explaining an assumed value of a width of a person.
FIG. 6(b) is a view explaining the assumed value of a width of a vehicle.
Figure 6:
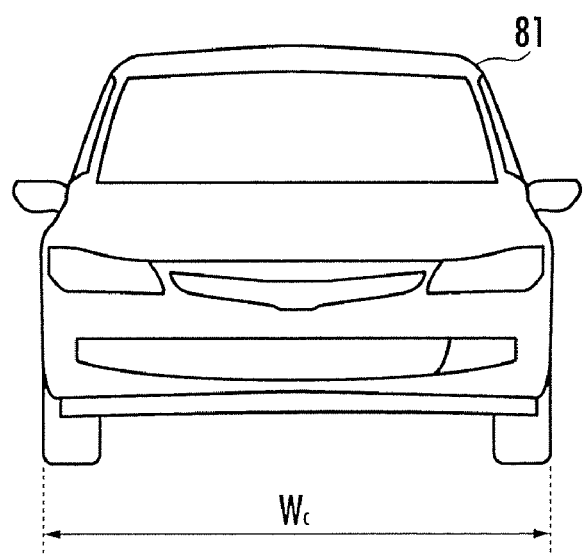

In identifying whether or not the type of the object is a vehicle, the target edge width Wt of the Gabor filter may be calculated using an assumed value Wc of a car width shown in FIG. 6(*b*) and the distance Z between the object and the cameras 2R, 2L, and substituting Wp in the above-explained equation (3) with Wc.

In subsequent STEP 4, the filtering unit 23 performs the filtering process to the local processing region, with the Gabor filter setting the target edge width as explained above, and taking the vertical direction as the target edge direction. The process of executing the filtering with the Gabor filter by the filtering unit 23 corresponds to a filtering step in the vehicle periphery monitoring method of the present invention.

Subsequent STEP 5 to STEP 6 are processes by the object type identifying unit 24. The object type identifying unit 24 performs a binarizing process to the image of the local processing region after being executed with the filtering process with the Gabor filter. FIG. 7 shows binary images 100, 110, 120 (corresponds to a second image portion of the present invention) obtained by executing the filtering process with the Gabor filter to an image 90 including an image portion 91 of the pedestrian with short distance Z to the cameras 2R, 2L, an image portion 92 of the pedestrian with middle distance Z to the cameras 2R, 2L, and an image portion 93 of the pedestrian with far distance Z to the cameras 2R, 2L, and then performing binarizing process thereto.

The binary image 100 is a binary image binarizing the image after performing the filtering process with the Gabor filter for far distance corresponding to the image portion 93, to the image 90, in which a white region 101 including the vertical edge corresponding to the image portion 93 is extracted. Further, the binary image 110 is a binary image binarizing the image after performing the filtering process with the Gabor filter for middle distance corresponding to the image portion 92, to the image 90, in which a white region 111 including the vertical edge corresponding to the image portion 92 is extracted.

Still further, the binary image 120 is a binary image binarizing the image after performing the filtering process with the Gabor filter for close distance corresponding to the image portion 91, to the image 90, in which a white region 121 including the vertical edge corresponding to the image portion 91 is extracted. As is explained above, by binarizing the image after executing the filtering process with the Gabor filter corresponding to the distance Z to the object, it becomes possible to clearly extract the edge shape of the object.

In subsequent STEP 6, an object type identifying unit 24 identifies whether or not the object in real space corresponding to the white region is a pedestrian, from the shape of the white region with the vertical edge extracted by the binarizing process in STEP 5.

Figure 8:
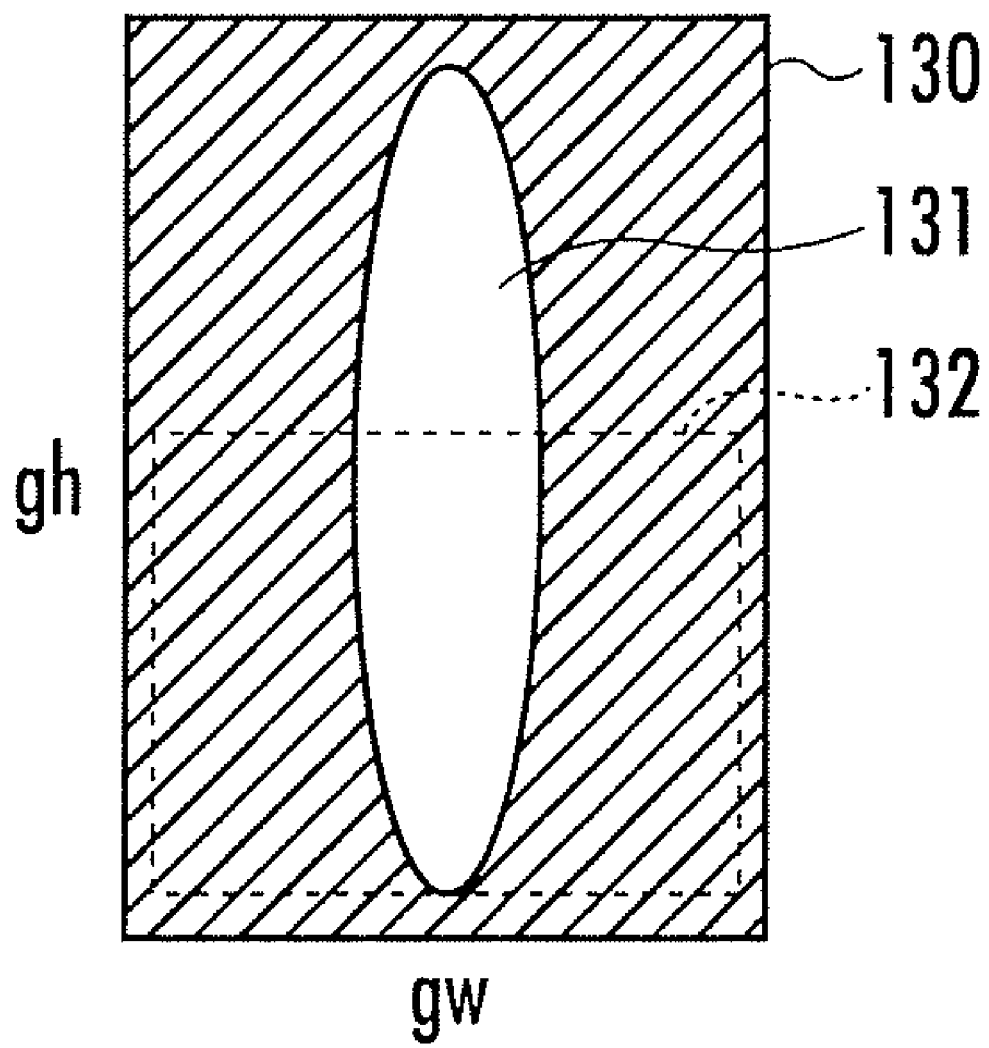
FIG. 8 is a view explaining an identification method of a pedestrian, and setting of a width of an image portion.

With reference to FIG. 8, the object type identifying unit 24 identifies the type of the object in real space corresponding to a white region 131 as a pedestrian, when the lower end of the white region 131 included in the local processing region 130 exists in a lower half region 132 of the local processing region 130 (it is assumed that the image portion of legs of the pedestrian is extracted).

The process of identifying the type of the object in real space corresponding to the image portion by the object type identifying unit 24, on the basis of the shape of the image portion (the second image portion) extracted by the filtering process with the Gabor filter, corresponds to an object type identifying step of the vehicle periphery monitoring method of the present invention.

The identification on whether or not the object is a pedestrian on the basis of the shape of the white region 131 may be carried out by other criteria, for example taking as a reference a width in the vertical direction (height) or a width in the horizontal direction of the white region 131, ratio of the height of the white region 131 with respect to the height gh of the local processing region 130, and the like.

When the type of the object is identified as pedestrian by the object type identifying unit 24, the image processing unit 1 warns the driver, with sound output from the loudspeaker 6 and with display to the HUD 7.

In the present exemplary embodiment, the surrounding region of the image portion of the object is set as the local processing region, and the filtering process with the Gabor filter and the binalizing process after the filtering process are performed to the local processing region only. However, the filtering process with the Gabor filter and the binalizing process after the filtering process may be performed to the whole range of the acquired image without setting the local processing region.

Further, in the present exemplary embodiment, the distance between the object and the cameras 2R, 2L is detected using the milliwave radar device 8. However, other types of ranging device such as a laser radar may be used. Alternatively, the distance between the object in real space and the infrared cameras 2R, 2L may be detected, on the basis of misalignment of the image portion of an identical object by two infrared cameras 2R, 2L in the horizontal direction (disparity). In this case, the real space position (coordinate values of X, Y, Z in FIG. 2) may be corrected by reading the vehicle speed VCAR detected by the velocity sensor 4 and the yaw rate YR detected by the yaw rate sensor 3, calculating the turning angle of the vehicle 10 by time integrating the yaw rate YR, and performing turning angle correction.

Further, the distance between the object and the cameras 2R, 2L may be detected from the change in the size of the image portions of the identical object in the acquired images taken by one camera at different points in time.

Further, in the present exemplary embodiment, the configuration in which the image of the front of the vehicle is acquired is shown. However, it may be a configuration in which the periphery of the vehicle is monitored by acquiring images of other direction, such as the rear, the side and the like of the vehicle.

Further, in the present exemplary embodiment, the infrared cameras 2R, 2L are used as the camera of the present invention. However, a visible camera taking visible images may be used.

Further, in the present exemplary embodiment, two infrared cameras 2R, 2L are used as the camera of the present invention. However, it is possible to only use one camera.

As is explained above, according to the vehicle periphery monitoring device, the vehicle, the vehicle periphery monitoring program, and the vehicle periphery monitoring method of the present invention, the type of the object may be identified accurately, on the basis of the shape of the outline of the image portion of the object extracted from the acquired image by the camera, and it is useful in monitoring the periphery of the vehicle.

The invention claimed is:

1. A vehicle periphery monitoring device which monitors a periphery of a vehicle on the basis of acquired images by a camera mounted on the vehicle and acquiring images of the periphery of the vehicle, comprising:
   a distance detecting unit which detects a distance between the camera and an object;
   an object image extracting unit which extracts a first image portion of the object from the acquired image by the camera;
   a local processing region setting unit which sets, on the basis of an assumed value of a size of a pedestrian, and the distance between the object in real space corresponding to the first image portion and the camera detected by the distance detecting unit, a surrounding region of the first image portion including the first image portion as a local processing region,
   a filtering unit which performs only to the local processing region, on the basis of an assumed value of a width in a horizontal direction of the pedestrian, and the distance between the camera and the object in real space corresponding to the first image portion detected by the distance detecting unit, a filtering process to the acquired image with a Gabor filter, in which a target edge width is set to be narrower as the assumed value of the width is smaller and the distance is longer, and in which a target edge direction is set to a direction orthogonal to the horizontal direction; and
   an object type identifying unit which identifies the type of the object in real space corresponding to the second image portion as a pedestrian, when a lower end of the second image portion extracted by the filtering process performed to the local processing region is included in a lower half region of the local processing region in the local processing region.

2. The vehicle periphery monitoring device according to claim 1,
   wherein the distance detecting unit detects the distance between the object and the camera from a change in a size of the image portion of the identical object in the acquired images taken by one camera at different points in time.

* * * * *